US012789294B2

(12) United States Patent
Lee et al.

(10) Patent No.: US 12,789,294 B2
(45) Date of Patent: Nov. 10, 2026

(54) NOTCHING APPARATUS

(71) Applicant: LG Energy Solution, Ltd., Seoul (KR)

(72) Inventors: Hyuk Soo Lee, Daejeon (KR); Tae Su Kim, Daejeon (KR); Myoung Jin Ko, Daejeon (KR); Hyo Jin Lee, Daejeon (KR); Sung Jun Jo, Daejeon (KR); Gil Woo Kim, Daejeon (KR); Jung Hyun Park, Daejeon (KR); Byung Hee Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 793 days.

(21) Appl. No.: 18/036,333

(22) PCT Filed: Dec. 10, 2021

(86) PCT No.: PCT/KR2021/018801
§ 371 (c)(1),
(2) Date: May 10, 2023

(87) PCT Pub. No.: WO2022/139286
PCT Pub. Date: Jun. 30, 2022

(65) Prior Publication Data

US 2023/0405728 A1 Dec. 21, 2023

(30) Foreign Application Priority Data

Dec. 24, 2020 (KR) ........................ 10-2020-0183967
Nov. 30, 2021 (KR) ........................ 10-2021-0169526

(51) Int. Cl.
*B23K 26/38* (2014.01)
*B23K 26/073* (2006.01)
(Continued)

(52) U.S. Cl.
CPC ............ *B23K 26/38* (2013.01); *B23K 26/073* (2013.01); *B23K 26/082* (2015.10); *H01M 10/0404* (2013.01); *B23K 2101/38* (2018.08)

(58) Field of Classification Search
CPC .... B23K 26/08; B23K 26/0643; B23K 26/00; B23K 2101/38; B23K 26/082; B23K 26/38; H01M 10/0404
(Continued)

(56) References Cited

U.S. PATENT DOCUMENTS 4,566,765 A * 1/1986 Miyauchi ........... B23K 26/0604 219/121.6
2004/0033702 A1 2/2004 Tamanyan et al.
(Continued)

FOREIGN PATENT DOCUMENTS

CN 1461355 A 12/2003
CN 101432094 A 5/2009
(Continued)

OTHER PUBLICATIONS

Extended European Search Report including Written Opinion for Application No. 21911353.7 dated May 28, 2024, pp. 1-8.
(Continued)

*Primary Examiner* — Jimmy Chou
(74) *Attorney, Agent, or Firm* — Lerner David LLP

(57) ABSTRACT

A notching apparatus relates to a notching apparatus for notching an electrode sheet used in a secondary battery, the notching apparatus including: an ablation laser source unit configured to radiate ablation laser that performs an ablation operation on the electrode sheet; a notching laser source unit configured to radiate notching laser, wherein the notching laser is emitted to the place, in which the ablation operation has been performed by the ablation laser, to notch the electrode sheet; and an integral scanner unit to which the
(Continued)

ablation laser radiated from the ablation laser source unit and the notching laser radiated from the notching laser source unit are incident. The integral scanner unit allows the ablation laser and the notching laser to be emitted to positions adjacent to each other on the electrode sheet.

10 Claims, 3 Drawing Sheets

(51) Int. Cl.
*B23K 26/082* (2014.01)
*H01M 10/04* (2006.01)
*B23K 101/38* (2006.01)

(58) Field of Classification Search
USPC ........................................ 219/121.67, 121.72
See application file for complete search history.

(56) References Cited

U.S. PATENT DOCUMENTS

| | | | | |
|---|---|---|---|---|
| 2004/0129685 | A1* | 7/2004 | Arai | B23K 26/382 219/121.77 |
| 2004/0149705 | A1* | 8/2004 | Yamada | B81C 1/00103 |
| 2006/0237402 | A1* | 10/2006 | Nagashima | B23K 26/0604 219/121.64 |
| 2009/0057284 | A1* | 3/2009 | Fukuda | B23K 26/0604 219/121.72 |
| 2009/0073586 | A1* | 3/2009 | Fry | G01N 21/71 219/121.68 |
| 2011/0095003 | A1* | 4/2011 | Sakurai | B23K 26/0617 219/121.64 |
| 2013/0183833 | A1* | 7/2013 | Duan | B23K 26/0624 219/121.73 |
| 2016/0036009 | A1 | 2/2016 | Cho et al. | |
| 2016/0263705 | A1 | 9/2016 | Kim et al. | |
| 2018/0229332 | A1* | 8/2018 | Tsai | B23K 26/082 |
| 2019/0160596 | A1* | 5/2019 | Sakurai | H01M 10/0413 |
| 2020/0276670 | A1 | 9/2020 | Watanabe | |
| 2020/0295360 | A1 | 9/2020 | Bae et al. | |
| 2021/0245302 | A9 | 8/2021 | Watanabe | |
| 2022/0118556 | A1 | 4/2022 | Sakurai | |
| 2022/0158152 | A1 | 5/2022 | Lee et al. | |

FOREIGN PATENT DOCUMENTS

| | | | |
|---|---|---|---|
| CN | 103252576 | A | 8/2013 |
| JP | 2011-206850 | A | 10/2011 |
| JP | 2013-119095 | A | 6/2013 |
| JP | 2015-188908 | A | 11/2015 |
| JP | 5965094 | B1 | 8/2016 |
| JP | 2017-033667 | A | 2/2017 |
| KR | 2013-0048006 | A | 5/2013 |
| KR | 101365805 | B1 | 3/2014 |
| KR | 2016-0015013 | A | 2/2016 |
| KR | 101680416 | B1 | 12/2016 |
| KR | 20170135122 | A | 12/2017 |
| KR | 2019-0062221 | A | 6/2019 |
| KR | 102076502 | B1 | 2/2020 |
| KR | 2020-0109764 | A | 9/2020 |
| WO | 2020-226261 | A1 | 11/2020 |

OTHER PUBLICATIONS

Search Report dated Apr. 26, 2025 from the Office Action for Chinese Application No. 202180072419.6 issued Apr. 30, 2025. 3 pages. (see p. 1-2, categorizing the cited references).

International Search Report for PCT/KR2021/018801 mailed Mar. 23, 23. 3 pgs.

* cited by examiner

NOTCHING APPARATUS

CROSS-REFERENCE TO RELATED APPLICATIONS

The present application is a national phase entry under 35 U.S.C. § 371 of the International Application No. PCT/KR2021/018801 filed on Dec. 10, 2021, which claims the benefit of Korean Patent Application Nos. 10-2020-0183967, filed on Dec. 24, 2020, and 10-2021-0169526, filed on Nov. 30, 2021, the disclosures of which are incorporated herein by reference in their entireties.

FIELD OF THE INVENTION

The present invention relates to a notching apparatus, capable of solving poor quality of notching by lowering sensitivity of notching with respect to laser alignment through minimizing a distance between ablation laser and notching laser and capable of reducing costs of spaces and investments by performing existing two processes with only one apparatus.

BACKGROUND OF THE INVENTION

Secondary batteries are eco-friendly energy sources that can reduce the size of a product and bring less environmental pollution. Recently, due to the above advantage, there is an increasing demand for the secondary batteries. In terms of shapes, the secondary batteries can be divided into a prismatic type and a pouch type. In terms of materials, the secondary batteries can be divided into lithium secondary batteries, such as lithium ion batteries and lithium ion polymer batteries, having high energy density, discharge voltage, and output stability.

Generally, such a secondary battery is manufactured in a manner in which: a positive electrode plate and a negative electrode plate are constituted by applying electrode active materials onto the surfaces of current collectors, and a separator is interposed therebetween, thus making an electrode assembly; the electrode assembly is mounted inside a metal can having a cylindrical or prismatic shape or a pouch-type case made of an aluminum laminate sheet; and a liquid electrolyte is mainly injected in the electrode assembly, or the electrode assembly is impregnated with the liquid electrolyte, or a solid electrolyte is used.

An electrode body is processed to have an exposure portion, and the exposure portion serves as an electrode terminal for connecting a positive electrode and a negative electrode to the outside when the electrode assembly (a positive electrode, a negative electrode, and a separator) is constituted. The process is achieved by using a notching apparatus.

The notching apparatus is an apparatus for forming a terminal portion by cutting portions of an exposure portion of an electrode sheet and a coated portion on which an electrode active material is applied. To this end, the notching apparatus forms the terminal portion by cutting a portion of the exposure portion using punching or laser. Recently, as an apparatus for notching an electrode sheet, an apparatus using laser is more widely used than a punching apparatus. The laser apparatus enables efficient production while reducing damages to electrodes, and thus the rate of use thereof is increasing.

FIG. 1(*a*) is a perspective view illustrating a laser notching apparatus according to the related art. FIG. 1(*b*) is a cross-sectional view illustrating a cross-section of an electrode sheet notched by the laser notching apparatus according to the related art.

Referring to FIG. 1(*a*), ablation laser A radiated from an ablation laser source unit 10 is firstly emitted to an electrode sheet S while the electrode sheet travels in a moving direction. Then, notching laser N radiated from a notching laser source unit 30 is secondly emitted to a region of the electrode sheet S on which the ablation laser has been emitted. In this case, an ablation laser unit 1 and a notching laser unit 3 perform operations in separate states and separate positions.

Referring to FIG. 1(*b*), notching laser N may be emitted to a region, to which the ablation laser A has been emitted to perform the ablation operation. As illustrated in FIG. 1(*b*), the ablation operation may be intended to reduce the thickness of a portion of the electrode sheet S by removing the relevant portion of an electrode active material-coated portion S2 applied on a current collector S1. Also, subsequently, when the notching laser N is emitted, the electrode sheet S may be notched. The notching of the electrode sheet may represent that the electrode sheet S is completely cut at the relevant portion as designed.

In a notching process using the laser, a laser notching technique using the ablation as described above reduces the thickness through the laser ablation prior to the notching, and thus can enhance the productivity of the notching process. However, a laser ablation process and a laser notching process are separated, and thus, it is required to align these two laser beams. When misaligned, the notching is not properly performed. Thus, there has been a need for a notching apparatus and a notching method, which reduce a distance between the ablation process and the notching process and are little sensitive to the alignment.

BRIEF SUMMARY OF THE INVENTION

The present invention has been made to solve the above problems, and an object of the present invention is to provide a notching apparatus, capable of solving poor quality of notching by lowering sensitivity of notching with respect to laser alignment through minimizing a distance between ablation laser and notching laser and capable of reducing costs of spaces and investments by performing existing two processes with only one apparatus.

A notching apparatus according to the present invention relates to a notching apparatus for notching an electrode sheet used in a secondary battery, the notching apparatus including: an ablation laser source unit configured to radiate ablation laser that performs an ablation operation on the electrode sheet; a notching laser source unit configured to radiate notching laser, wherein the notching laser is emitted to the place, in which the ablation operation has been performed by the ablation laser, to notch the electrode sheet; and an integral scanner unit to which the ablation laser radiated from the ablation laser source unit and the notching laser radiated from the notching laser source unit are incident, wherein the integral scanner unit allows the ablation laser and the notching laser to be emitted to positions adjacent to each other on the electrode sheet.

The notching apparatus may further include a reflector unit that allows the laser to be transmitted therethrough or reflected therefrom, wherein the ablation laser and the notching laser come from the ablation laser source unit and the notching laser source unit, respectively, and enter the integral scanner unit via the reflector unit.

The ablation laser may be emitted out in a direction parallel to a traveling direction of the electrode sheet and then incident to the integral scanner unit via the reflector unit, and the notching laser may be emitted out in a direction perpendicular to the traveling direction of the electrode sheet and then incident to the integral scanner unit through the reflector unit.

Transmittance or reflectance of the laser in the reflector unit may be adjusted according to a wavelength of the incident laser.

The wavelength of the ablation laser may be 512 to 532 nm, and the wavelength of the notching laser may be 1060 to 1080 nm.

The wavelength of the notching laser may be 512 to 532 nm, and the wavelength of the ablation laser may be 1060 to 1080 nm.

The reflector unit may allow the ablation laser to be reflected therefrom and allow the notching laser to be transmitted therethrough.

At least one of a beam size adjustment unit for adjusting a size of a laser beam and a separation scanner unit for transmitting the laser beam to a desired place may be provided on a path, through which the ablation laser travels, between the ablation laser source unit and the reflector, and the ablation laser may be transmitted to the reflector after passing through at least one of the beam size adjustment unit and the separation scanner unit.

At least one of a beam size adjustment unit for adjusting a size of a laser beam and a separation scanner unit for transmitting the laser beam to a desired place may be provided on a path, through which the notching laser travels, between the notching laser source unit and the reflector, and the notching laser may be transmitted to the reflector after passing through at least one of the beam size adjustment unit and the separation scanner unit.

The ablation laser source unit, the notching laser source unit, the reflector unit, and the integral scanner unit may be integrated and installed in one structure.

The ablation laser may be emitted out in a direction perpendicular to a traveling direction of the electrode sheet and then incident to the integral scanner unit through the reflector unit, and the notching laser may be emitted out in a direction parallel to the traveling direction of the electrode sheet and then incident to the integral scanner unit via the reflector unit.

The notching apparatus according to the present invention relates to a notching apparatus for notching an electrode sheet used in a secondary battery, the notching apparatus including: an ablation laser source unit for radiating ablation laser that performs an ablation operation on the electrode sheet; a notching laser source unit for radiating notching laser, wherein the notching laser is emitted to the place, in which the ablation operation has been performed by the ablation laser, to notch the electrode sheet; and an integral scanner unit to which the ablation laser radiated from the ablation laser source unit and the notching laser radiated from the notching laser source unit are incident. The integral scanner unit allows the ablation laser and the notching laser to be emitted to positions adjacent to each other on the electrode sheet. Accordingly, it is possible to solve poor quality of notching by lowering sensitivity of notching with respect to laser alignment through minimizing a distance between ablation laser and notching laser and reduce costs of spaces and investments by performing existing two processes with only one apparatus.

BRIEF DESCRIPTION OF THE DRAWINGS

FIG. 1(*b*) is a cross-sectional view illustrating a cross-section of an electrode sheet notched by the laser notching apparatus according to the related art.

Figure 1A:
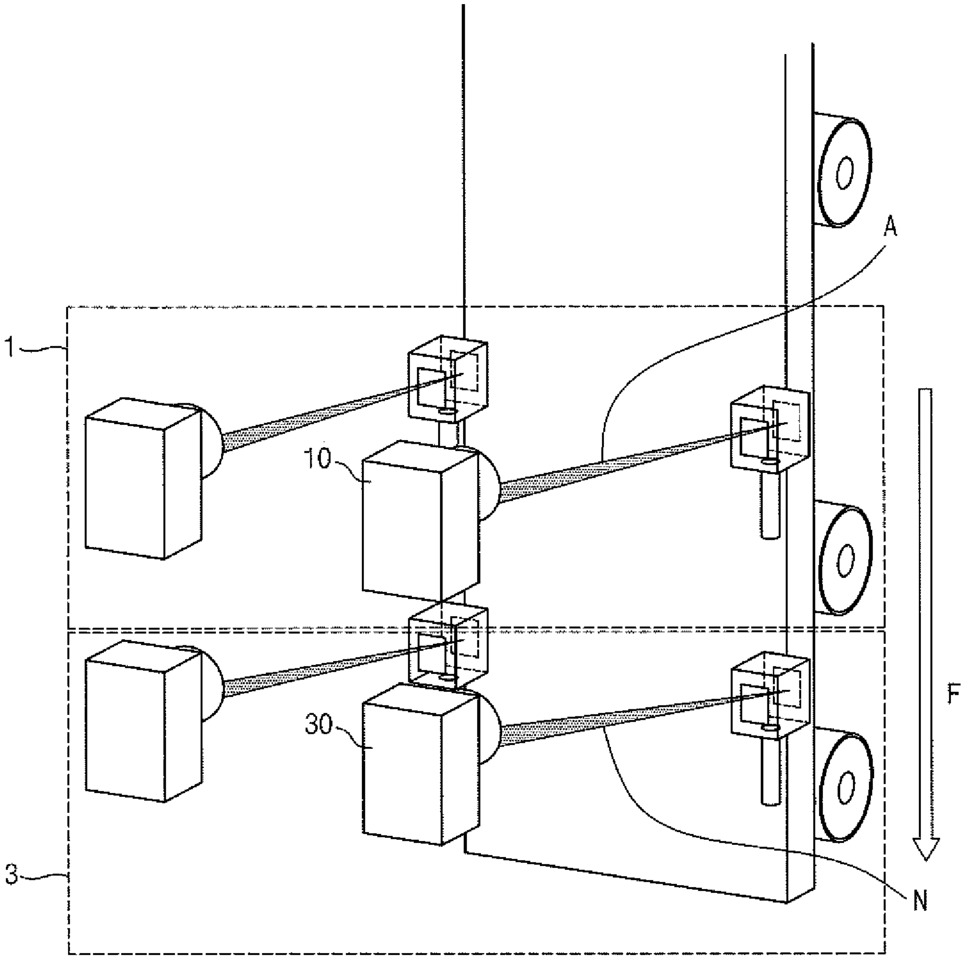
FIG. 1(a) (PRIOR ART)
FIG. 1(*a*) is a perspective view illustrating a laser notching apparatus according to the related art.

Hereinafter, preferred embodiments of the present invention will be described in detail with reference to the accompanying drawings so as to be easily carried out by a person skilled in the art to which the present invention pertains. However, the present invention may be embodied in various different forms, and is neither limited nor restricted to the following embodiments.

In order to clearly describe the present invention, parts irrelevant to the description are omitted, and descriptions related to well-known functions or configurations are ruled out so as not to unnecessarily obscure subject matters of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term to describe his or her invention in the best ways.

Embodiment 1

Figure 2:
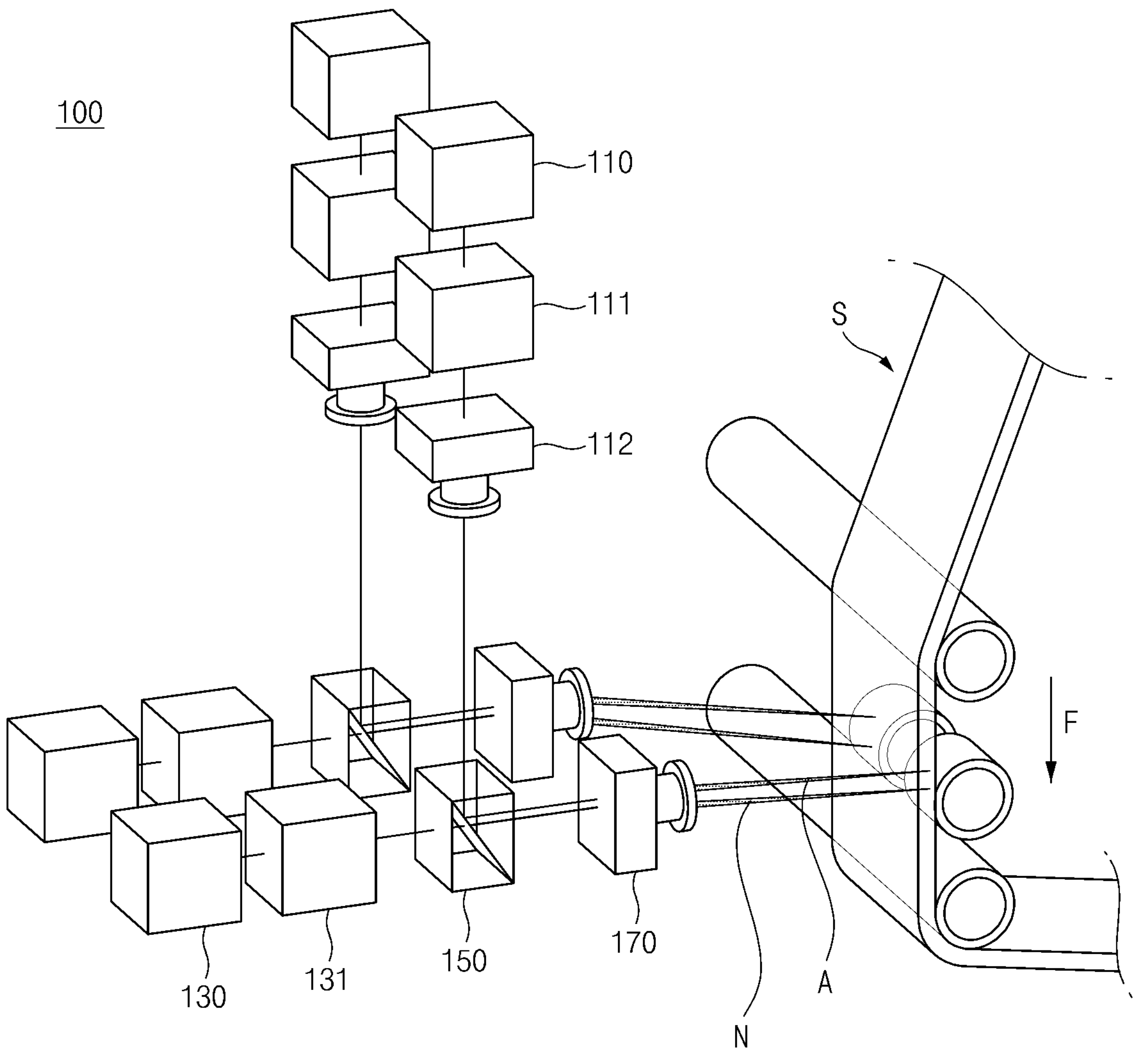
FIG. 2 is a perspective view illustrating a notching apparatus according to Embodiment 1 of the present invention.

FIG. 2 is a perspective view illustrating a notching apparatus according to Embodiment 1 of the present invention.

Referring to FIG. 2, a notching apparatus 100 according to the present invention may be a notching apparatus for notching an electrode sheet S used in a secondary battery. However, the present invention is not limited to the electrode sheet S. Objects, such as an electrode body, an electrode film, and the like, which can be processed through the notching, may be included in a scope of the present invention.

The notching apparatus 100 according to Embodiment 1 of the present invention may include an ablation laser source unit 110, a notching laser source unit 130, and an integral scanner unit 170.

Figure 1B:
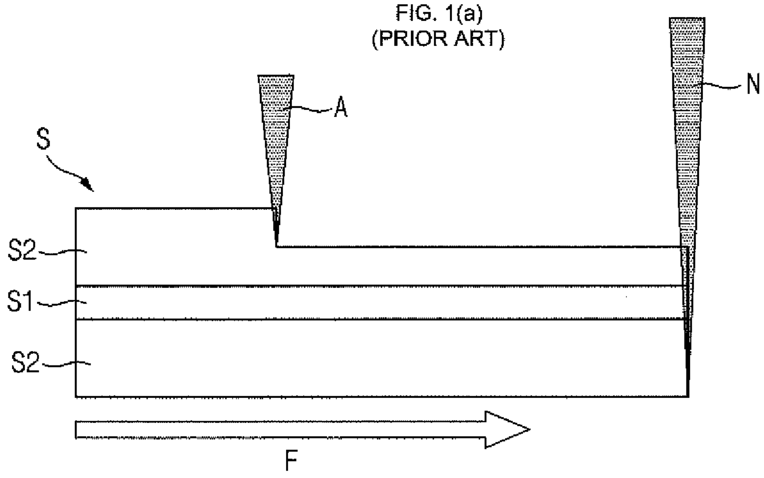
FIG. 1(b) (PRIOR ART)

The ablation laser source unit 110 may be configured to radiate ablation laser A that performs an ablation operation on the electrode sheet S. As illustrated in FIG. 1(*b*), the ablation operation may be intended to reduce the thickness of a portion of the electrode sheet S by removing the relevant portion of an active material-coated portion.

The notching laser source unit 130 may be configured to radiate notching laser N, and the notching laser is emitted to the place, in which the ablation operation has been performed by the ablation laser A, to notch the electrode sheet S. When the notching laser N is emitted, the electrode sheet S may be notched. The notching of the electrode sheet S may represent that the electrode sheet S is completely cut at the relevant portion as designed.

The integral scanner unit 170 may be configured such that the ablation laser A radiated from the ablation laser source unit 110 and the notching laser N radiated from the notching laser source unit 130 are incident thereto. The scanner unit may be configured to transmit the laser beam to a desired place. Particularly, the integral scanner unit 170 may allow the ablation laser A and the notching laser N to be emitted to positions adjacent to each other on the electrode sheet S. That is, the ablation laser A and the notching laser N may be emitted to the positions adjacent to each other on the electrode sheet S after passing through the integral scanner unit 170. Here, the emission to the positions adjacent to each other may represent a state in which poor quality of notching due to misalignment between the ablation laser A and the notching laser N does not occur. That is, the positions adjacent to each other may represent positions close enough to ensure that the notching is performed without problems. For example, the distance between an emission position of the ablation laser A and an emission position of the notching laser N may be 0.1 mm to 50 mm.

The notching apparatus 100 having the above configuration according to Embodiment 1 of the present invention may solve poor quality of notching by lowering sensitivity of notching with respect to laser alignment through minimizing the distance between the ablation laser A and the notching laser N.

The notching apparatus 100 according to Embodiment 1 of the present invention may further include a reflector unit 150 that allows the laser to be transmitted therethrough or reflected therefrom. The ablation laser A and the notching laser B may come from the ablation laser source unit 110 and the notching laser source unit 130, respectively, and enter the integral scanner unit 170 via the reflector unit 150.

Referring to FIG. 2, the ablation laser A is emitted out in a direction parallel to a traveling direction F of the electrode sheet S and then may be incident to the integral scanner unit 170 via the reflector unit 150. The ablation laser A travels from the upper side to the lower side with reference to FIG. 2 and is reflected from the reflector unit 150, and then may turn to the right side with reference to FIG. 2 and travel toward the electrode sheet S. Also, the ablation laser may pass through the integral scanner unit 170 prior to arriving the electrode sheet S.

The ablation laser A may pass through a beam size adjustment unit 111 and a separation scanner unit 112, which will be described below, while traveling from the upper side to the lower side with reference to FIG. 2. The ablation laser A, which has passed through the beam size adjustment unit 111 and the separation scanner unit 112, is reflected from the reflector unit 150 placed 45 degrees relative to the traveling direction, and accordingly, the traveling direction thereof may be bent 90 degrees and then directed in a direction toward the electrode sheet S.

The notching laser N is emitted out in a direction perpendicular to the traveling direction F of the electrode sheet S and then may be incident to the integral scanner unit 170 through the reflector unit 150. Here, the notching laser N may go through a beam size adjustment unit 131, which will be described later, while incident to the reflector unit 150 after coming from a source of the notching laser N.

The notching laser N is emitted out from the left side toward the right side with reference to FIG. 2 and moves and passes right through the reflector unit 150, and then may be incident to the integral scanner unit 170 and arrive at the electrode sheet S. The traveling direction of the notching laser N when radiated from the notching laser source unit 130 may not be bent at the reflector unit 150. That is, the notching laser N may pass through the reflector unit 150 while maintaining the traveling direction before and after going through the reflector unit 150.

The transmittance or reflectance of the laser in the reflector unit 150 may be adjusted according to a wavelength of the incident laser. Accordingly, the reflector unit 150 may be configured to allow the ablation laser A to be reflected therefrom and the notching laser N to be transmitted therethrough, or to allow the ablation laser A to be transmitted therethrough and the notching laser N to be reflected therefrom.

In the notching apparatus 100 according to Embodiment 1 of the present invention, the reflector unit 150 may allow the ablation laser A to be reflected therefrom and the notching laser N to be transmitted therethrough according to the wavelength.

For example, the wavelength of the ablation laser A may be 512 to 532 nm, and the wavelength of the notching laser N may be 1060 to 1080 nm. Also, the reflector unit 150 may be configured to have high transmittance and low reflectance when the wavelength is large. In this case, when the wavelength is small, the transmittance may be low, and the reflectance may be high. Thus, the ablation laser A having the wavelength of 512 to 532 nm may be reflected from the reflector unit 150, and the notching laser N having the wavelength of 1060 to 1080 nm may be transmitted through the reflector unit 150.

The wavelengths of the ablation laser A and the notching laser N may be defined as regions distinguished from each other.

In the notching apparatus 100 according to the present invention, at least one of a beam size adjustment unit 111 for adjusting a size of a laser beam and a separation scanner unit 112 for transmitting the laser beam to a desired place may be provided on a path, through which the ablation laser A travels, between the ablation laser source unit 110 and the reflector. Accordingly, the ablation laser A may be transmitted to the reflector after passing through at least one of the beam size adjustment unit 111 and the separation scanner unit 112.

Referring to FIG. 2, in particular, the notching apparatus 100 according to Embodiment 1 of the present invention may be provided with the beam size adjustment unit 111 and the scanner unit 112 between the ablation laser source unit 110 and the reflector unit 150. The ablation laser A may pass through the beam size adjustment unit 111 and the separation scanner unit 112 before incident to the reflector unit 150.

The beam size adjustment unit 111 may adjust the size of laser beam, and may use the laser beam by adjusting the size thereof as much as needed to perform necessary ablation. The necessary adjustment of size or depth of ablation may be performed. The separation scanner unit 112 may serve to transmit the laser to the desired place. The transmission of the ablation laser A may be adjusted so that the ablation laser A arrives at the accurate position of the reflector unit 150.

At least one of a beam size adjustment unit for adjusting a size of a laser beam and a separation scanner unit for transmitting the laser beam to a desired place may also be provided on a path, through which the notching laser N travels, between the notching laser source unit 130 and the reflector unit 150. In this case, the notching laser N may be transmitted to the reflector after passing through at least one of the beam size adjustment unit and the separation scanner unit.

Referring to FIG. 2, in particular, the notching apparatus 100 according to Embodiment 1 of the present invention may be provided with the beam size adjustment unit 131 between the notching laser source unit 130 and the reflector unit 150. The notching laser A may pass through the beam size adjustment unit 131 before incident to the reflector unit

150. The degree, intensity, or speed of notching may be adjusted by adjusting the beam size of the notching laser N.

As illustrated in FIG. 2, the direction of the notching laser N is not bent until arriving at the electrode sheet S after emitted out from the notching laser source unit 130, and this case may be configured such that the notching laser does not pass through the separation scanner unit 112. However, this is merely one example, and the separation scanner unit 112 may be added as necessary so that the notching laser N passes through the separation scanner unit 112 between the beam size adjustment unit 131 and the reflector unit 150.

Also, in the notching apparatus 100 according to Embodiment 1 of the present invention, the ablation laser source unit 110, the notching laser source unit 130, the reflector unit 150, and the integral scanner unit 170 may be integrated and installed in one structure. Furthermore, all of the ablation laser source unit 110, the notching laser source unit 130, the beam size adjustment units 111 and 131, the separation scanner unit 112, the reflector unit 150, and the integral scanner unit 170 may be integrated and installed in one structure. When integrated and installed in one structure in a manner described above, the notching apparatus 100 may be obtained with one apparatus unlike the related art in which notching is performed through two processes. Thus, the costs of spaces and investments may be reduced.

Embodiment 2

Figure 3:
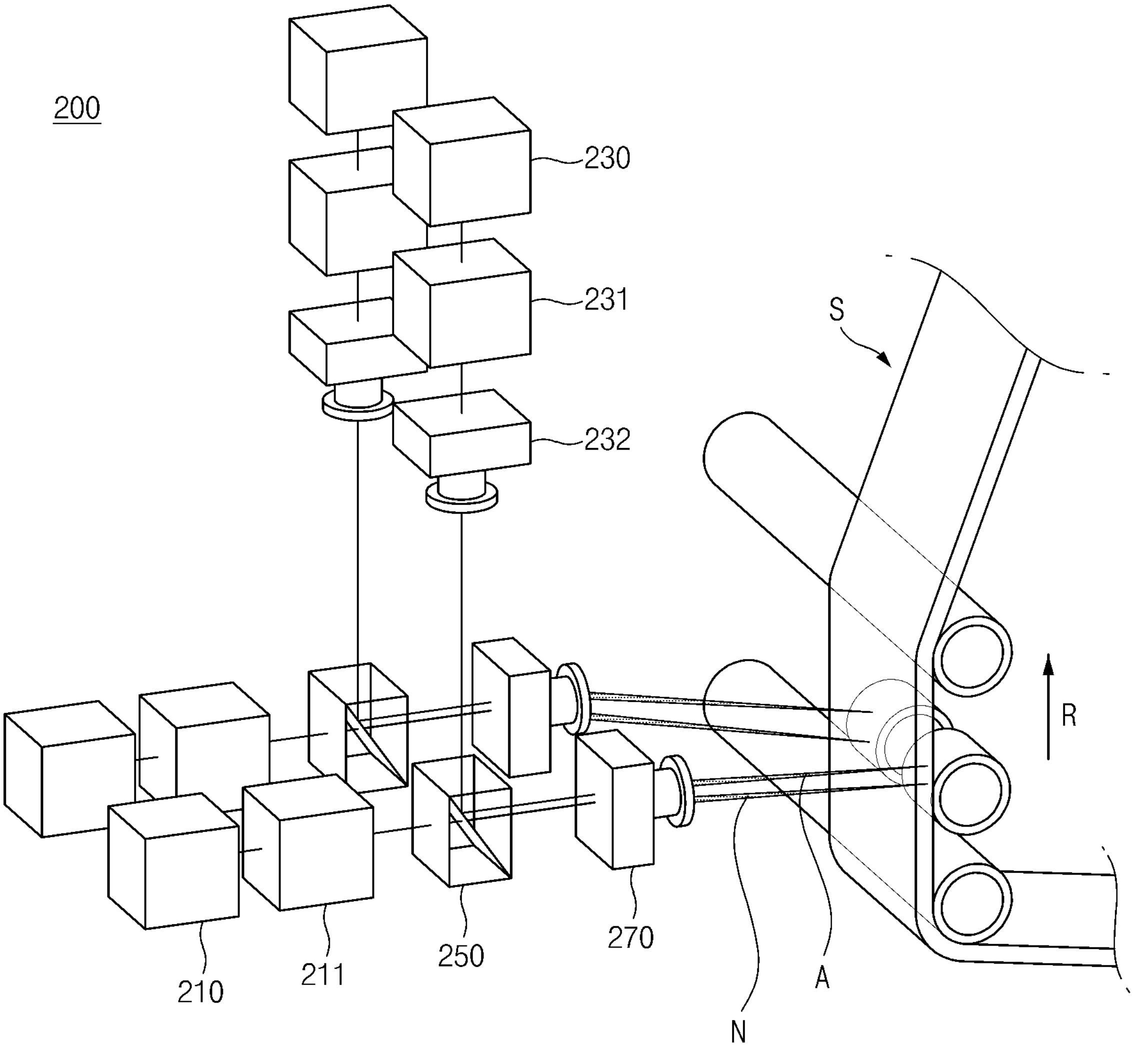
FIG. 3 is a perspective view illustrating a notching apparatus according to Embodiment 2 of the present invention.

FIG. 3 is a perspective view illustrating a notching apparatus according to Embodiment 2 of the present invention.

Embodiment 2 of the present invention is different from Embodiment 1 in that laser reflected from a reflector unit 250 and having a bent traveling direction is notching laser N while laser transmitted through the reflector unit 250 and maintaining the traveling direction is ablation laser A.

Embodiment 2 will be described with a focus on the differences, and the features common to Embodiment 1 will be omitted as much as possible. That is, it is obvious that features not described in Embodiment 2 may be regarded as the features of Embodiment 1 if necessary.

Referring to FIG. 3, a notching apparatus 200 according to Embodiment 2 of the present invention may include an ablation laser source unit 210, a notching laser source unit 230, a reflector unit 250, and an integral scanner unit 270.

The ablation laser source unit 210 may be configured to radiate ablation laser A that performs an ablation operation on the electrode sheet S. The notching laser source unit 230 may be configured to radiate notching laser N, and the notching laser is emitted to the place, in which the ablation operation has been performed by the ablation laser A, to notch the electrode sheet S. The reflector unit 250 may be configured to allow the laser to be transmitted therethrough or reflected therefrom according to a wavelength. The integral scanner unit 270 may be configured such that the ablation laser A radiated from the ablation laser source unit 210 and the notching laser N radiated from the notching laser source unit 230 are incident thereto. The integral scanner unit 270 may allow the ablation laser A and the notching laser N to be emitted to positions adjacent to each other on the electrode sheet S. Here, the emission to the positions adjacent to each other may represent a state in which poor quality of notching due to misalignment between the ablation laser A and the notching laser N does not occur. That is, the positions adjacent to each other may represent positions close enough to ensure that the notching is performed without problems. For example, the distance between an emission position of the ablation laser A and an emission position of the notching laser N may be 0.1 mm to 50 mm.

As illustrated in FIG. 3, in the notching apparatus 200 according to Embodiment 2 of the present invention, the ablation laser A may be configured to be emitted out in a direction perpendicular to a traveling direction R of the electrode sheet S and then incident to the integral scanner unit 270 through the reflector unit 250. Also, the notching laser N may be emitted out in a direction parallel to the traveling direction R of the electrode sheet S and then incident to the integral scanner unit 270 via the reflector unit 250.

Referring to FIG. 3, the notching laser N is emitted out in a direction parallel to the traveling direction R of the electrode sheet S and then may be incident to the integral scanner unit 270 via the reflector unit 250. The notching laser N travels from the upper side to the lower side with reference to FIG. 3 and is reflected from the reflector unit 250, and then may turn to the right side with reference to FIG. 3 and travel toward the electrode sheet S. Also, the notching laser may pass through the integral scanner unit 270 prior to arriving the electrode sheet S.

In addition, the notching laser N may pass through a beam size adjustment unit 231 and a separation scanner unit 232 while traveling from the upper side to the lower side with reference to FIG. 3. The notching laser N, which has passed through the beam size adjustment unit 231 and the separation scanner unit 232, is reflected from the reflector unit 250 placed 45 degrees relative to the traveling direction, and accordingly, the traveling direction thereof may be bent 90 degrees and then directed toward the electrode sheet S.

The ablation laser A is emitted out in a direction perpendicular to the traveling direction R of the electrode sheet S and then may be incident to the integral scanner unit 270 through the reflector unit 250. Here, the ablation laser A may go through a beam size adjustment unit 211 before incident to the reflector unit 250 after coming from the ablation laser source unit 210.

The ablation laser A is emitted out from the left side toward the right side with reference to FIG. 3 and moves and passes right through the reflector unit 250, and then may be incident to the integral scanner unit 270 and arrive at the electrode sheet S. The traveling direction of the ablation laser A when radiated from the ablation laser source unit 210 may not be bent at the reflector unit 250. That is, the ablation laser A may pass through the reflector unit 250 while maintaining the traveling direction before and after going through the reflector unit 250.

In the notching apparatus 200 according to Embodiment 2 of the present invention, the reflector unit 250 may allow the notching laser N to be reflected therefrom and the ablation laser A to be transmitted therethrough according to the wavelength.

For example, the wavelength of the notching laser N may be 512 to 532 nm, and the wavelength of the ablation laser A may be 1060 to 1080 nm. Also, the reflector unit 250 may be configured to have high transmittance and low reflectance when the wavelength is large. In this case, when the wavelength is small, the transmittance may be low, and the reflectance may be high. Thus, the notching laser N having the wavelength of 512 to 532 nm may be reflected from the reflector unit 250, and the ablation laser A having the wavelength of 1060 to 1080 nm may be transmitted through the reflector unit 250.

As the wavelengths of the notching laser N and the ablation laser A are defined as regions distinguished from each other, the two laser beams may be incident from the reflector unit 250 to the integral scanner unit 270. Also, the integral scanner unit 270 may allow the ablation laser A and the notching laser N to be emitted to positions adjacent to each other on the electrode sheet S.

Through this, the notching apparatus 200 according to Embodiment 2 of the present invention may solve poor quality of notching by lowering sensitivity of notching with respect to laser alignment through minimizing the distance between the ablation laser A and the notching laser N and may reduce costs of spaces and investments by performing existing two processes with only one apparatus.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

1: Ablation laser unit
3: Notching laser unit
10: Ablation laser source unit
30: Notching laser source unit
100, 200: Notching apparatus
110, 210: Ablation laser source unit
111, 211:
112, 232: Separation scanner unit
130, 230: Notching laser source unit
131, 231: Beam size adjustment unit
150, 250: Reflector unit
170, 270: Integral scanner unit
S: Electrode sheet
S1: Current collector
S2: Electrode active material-coated portion
A: Ablation laser
N: Notching laser

The invention claimed is:

1. A notching apparatus for notching an electrode sheet used in a secondary battery, the notching apparatus comprising:

an ablation laser source unit configured to radiate ablation laser configured to perform an ablation operation on the electrode sheet;

a notching laser source unit configured to radiate notching laser, wherein the notching laser is configured to be emitted to a place, wherein the ablation operation has been performed by the ablation laser, to notch the electrode sheet; and an integral scanner unit to which the ablation laser radiated from the ablation laser source unit and the notching laser radiated from the notching laser source unit are configured to be incident, wherein the integral scanner unit is configured to allow the ablation laser and the notching laser to be emitted to positions adjacent to each other on the electrode sheet, wherein the ablation laser is configured to be emitted out in a direction parallel to a traveling direction of the electrode sheet and to be then incident to the integral scanner unit via the reflector unit, and wherein the notching laser is configured to be emitted out in a direction perpendicular to the traveling direction of the electrode sheet and to be then incident to the integral scanner unit through the reflector unit.

2. The notching apparatus of claim 1, further comprising a reflector unit configured to allow at least one of the ablation laser and the notching laser to be transmitted therethrough or reflected therefrom, wherein the ablation laser and the notching laser come from the ablation laser source unit and the notching laser source unit, respectively, and enter the integral scanner unit via the reflector unit.

3. The notching apparatus of claim 1, wherein transmittance or reflectance of the at least one of the ablation laser and the notching laser in the reflector unit is configured to be adjusted according to a wavelength of the incident one of the ablation laser and the notching laser.

4. The notching apparatus of claim 3, wherein the wavelength of the ablation laser is 512 to 532 nm, and the wavelength of the notching laser is 1060 to 1080 nm.

5. The notching apparatus of claim 3, wherein the wavelength of the notching laser is 512 to 532 nm, and the wavelength of the ablation laser is 1060 to 1080 nm.

6. The notching apparatus of claim 4, wherein the reflector unit is configured to allow the ablation laser to be reflected therefrom and to allow the notching laser to be transmitted therethrough.

7. The notching apparatus of claim 1, further comprising at least one of a first beam size adjustment unit for adjusting a size of a laser beam and a first separation scanner unit for transmitting the laser beam to a desired place on a path, through which the ablation laser travels, between the ablation laser source unit and the reflector, and wherein the ablation laser is configured to be transmitted to the reflector after passing through at least one of the first beam size adjustment unit and the first separation scanner unit.

8. The notching apparatus of claim 7, further comprising at least one of a second beam size adjustment unit for adjusting a size of a laser beam and a second separation scanner unit for transmitting the laser beam to a desired place on a path, through which the notching laser travels, between the notching laser source unit and the reflector, and wherein the notching laser is configured to be transmitted to the reflector after passing through at least one of the second beam size adjustment unit and the second separation scanner unit.

9. The notching apparatus of claim 8, wherein the ablation laser source unit, the notching laser source unit, the reflector unit, and the integral scanner unit are integrated and installed in one structure.

10. A notching apparatus for notching an electrode sheet used in a secondary battery, the notching apparatus comprising:

an ablation laser source unit configured to radiate ablation laser configured to perform an ablation operation on the electrode sheet;

a notching laser source unit configured to radiate notching laser, wherein the notching laser is configured to be emitted to a place, wherein the ablation operation has been performed by the ablation laser, to notch the electrode sheet; and an integral scanner unit to which the ablation laser radiated from the ablation laser source unit and the notching laser radiated from the notching laser source unit are configured to be incident, wherein the integral scanner unit is configured to allow the ablation laser and the notching laser to be emitted to positions adjacent to each other on the electrode sheet, wherein the ablation laser is configured to be emitted out in a direction perpendicular to a traveling direction of the electrode sheet and to be then incident to the integral scanner unit through the reflector unit, and wherein the notching laser is configured to be emitted out in a direction parallel to the traveling direction of the electrode sheet and is then incident to the integral scanner unit via the reflector unit.

* * * * *